(12) United States Patent
Shamir et al.

(10) Patent No.: US 12,456,047 B2
(45) Date of Patent: Oct. 28, 2025

(54) DISTILLING FROM ENSEMBLES TO IMPROVE REPRODUCIBILITY OF NEURAL NETWORKS

(71) Applicant: Google LLC, Mountain View, CA (US)

(72) Inventors: Gil Shamir, Sewickley, PA (US); Lorenzo Coviello, Pittsburgh, PA (US)

(73) Assignee: GOOGLE LLC, Mountain View, CA (US)

( * ) Notice: Subject to any disclaimer, the term of this patent is extended or adjusted under 35 U.S.C. 154(b) by 1060 days.

(21) Appl. No.: 17/025,418

(22) Filed: Sep. 18, 2020

(65) Prior Publication Data

US 2021/0158156 A1    May 27, 2021

Related U.S. Application Data

(60) Provisional application No. 62/938,645, filed on Nov. 21, 2019.

(51) Int. Cl.
*G06N 3/08* (2023.01)
*G06N 3/045* (2023.01)

(52) U.S. Cl.
CPC .............. *G06N 3/08* (2013.01); *G06N 3/045* (2023.01)

(58) Field of Classification Search
None
See application file for complete search history.

(56) References Cited

U.S. PATENT DOCUMENTS

| | | | |
|---|---|---|---|
| 11,816,185 B1* | 11/2023 | Roth | G06N 3/08 |
| 2017/0132528 A1* | 5/2017 | Aslan | G06N 20/00 |
| 2017/0372201 A1* | 12/2017 | Gupta | G06N 20/00 |
| 2019/0034764 A1* | 1/2019 | Oh | G06N 7/01 |
| 2019/0080240 A1* | 3/2019 | Andoni | G06N 3/086 |
| 2019/0197395 A1* | 6/2019 | Kibune | G06N 3/08 |
| 2020/0034703 A1* | 1/2020 | Fukuda | G06N 3/045 |

(Continued)

OTHER PUBLICATIONS

Romero et al., "FitNets: Hints for Thin Deep Nets", 2015, arXiv:1412.6550v4 [cs.LG], 13 pages (Year: 2015).*

(Continued)

*Primary Examiner* — Abdullah Al Kawsar
*Assistant Examiner* — Asher H. Jablon
(74) *Attorney, Agent, or Firm* — DORITY & MANNING P.A.

(57) ABSTRACT

Systems and methods can improve the reproducibility of neural networks by distilling from ensembles. In particular, aspects of the present disclosure are directed to a training scheme that utilizes a combination of an ensemble of neural networks and a single, "wide" neural network that is more powerful (e.g., exhibits a greater accuracy) than the ensemble. Specifically, the output of the ensemble can be distilled into the single neural network during training of the single neural network. After training, the single neural network can be deployed to generate inferences. In such fashion, the single neural model can provide a superior prediction accuracy while, during training, the ensemble can serve to influence the single neural network to be more reproducible. In addition, an additional single wide tower can be added to generate another output, that can be distilled to the single neural network, to further improve its accuracy.

27 Claims, 10 Drawing Sheets

(56) References Cited

U.S. PATENT DOCUMENTS

2020/0125927 A1* 4/2020 Kim ................... G06N 3/045
2020/0172098 A1* 6/2020 Abrahams .............. G06N 3/047

OTHER PUBLICATIONS

Clark et al., "BAM! Born-Again Multi-Task Networks for Natural Language Understanding", 2019, arXiv:1907.04829v1 [cs.CL], 7 pages (Year: 2019).*
Pohl et al., "Logarithm Odds Maps for Shape Representation," 2006, MICCAI 2006, pp. 955-963 (Year: 2006).*
Mavrin et al., "Deep Reinforcement Learning with Decorrelation," May 8, 2019, arXiv:1903.07765v3 [cs.LG], 13 pages (Year: 2019).*
Lee et al., "Collaborative Distillation for Top-N Recommendation," Nov. 13, 2019, arXiv:1911.05276v1 [cs.LG], 10 pages (Year: 2019).*
Malinin et al, "Ensemble Distribution Distillation", arXiv:1905v2, May 30, 2019, 11 pages.

* cited by examiner

US 12,456,047 B2

DISTILLING FROM ENSEMBLES TO IMPROVE REPRODUCIBILITY OF NEURAL NETWORKS

RELATED APPLICATIONS

This application claims priority to and the benefit of U.S. Provisional Patent Application No. 62/938,645, filed Nov. 21, 2019, which is hereby incorporated by reference in its entirety.

FIELD

The present disclosure relates generally to machine learning. More particularly, the present disclosure relates to systems and methods that improve the reproducibility of neural networks by distilling from ensembles.

BACKGROUND

Artificial neural networks ("neural networks") are a class of machine-learned models that include a group of connected nodes, which also can be referred to as neurons or perceptrons. A neural network can be organized into one or more layers. Neural networks that include multiple layers can be referred to as "deep" networks. Each node in a neural network can include an activation function. An activation function can define an output of a node given a set of inputs. Inputs to the neural network can propagate through the layers of nodes via the activation functions to compute the output of the neural network.

However, systems that train models using neural networks with high parallelism often produce networks that suffer from irreproducibility. In particular, two supposedly identical models that have been trained independently on the same set of training examples can generate different predictions. These deviations can result from different random initializations, parallelization, order of the training examples, and/or other factors. Furthermore, in online training systems, two networks which produce different predictions can evolve very differently with covariate shifts if their predictions control which subsequent training examples are seen.

SUMMARY

Aspects and advantages of embodiments of the present disclosure will be set forth in part in the following description, or can be learned from the description, or can be learned through practice of the embodiments.

One example aspect of the present disclosure is directed to a computing system configured to improve the reproducibility of neural networks. The computing system includes one or more processors and one or more non-transitory computer-readable media that collectively store: an ensemble that comprises a plurality of neural networks; a single neural network, wherein the single neural network exhibits a greater accuracy than the ensemble when trained on a shared training dataset; and instructions that, when executed by the one or more processors, cause the computing system to perform operations. The operations include: accessing, by the computing system, one or more training examples; processing, by the computing system, each of the one or more training examples with the ensemble to obtain an ensemble output from the ensemble; processing, by the computing system, each of the one or more training examples with the single neural network to obtain a network output from the single neural network; and training, by the computing system, the single neural network using a loss function that, at least in part, penalizes a difference between the network output and the ensemble output.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
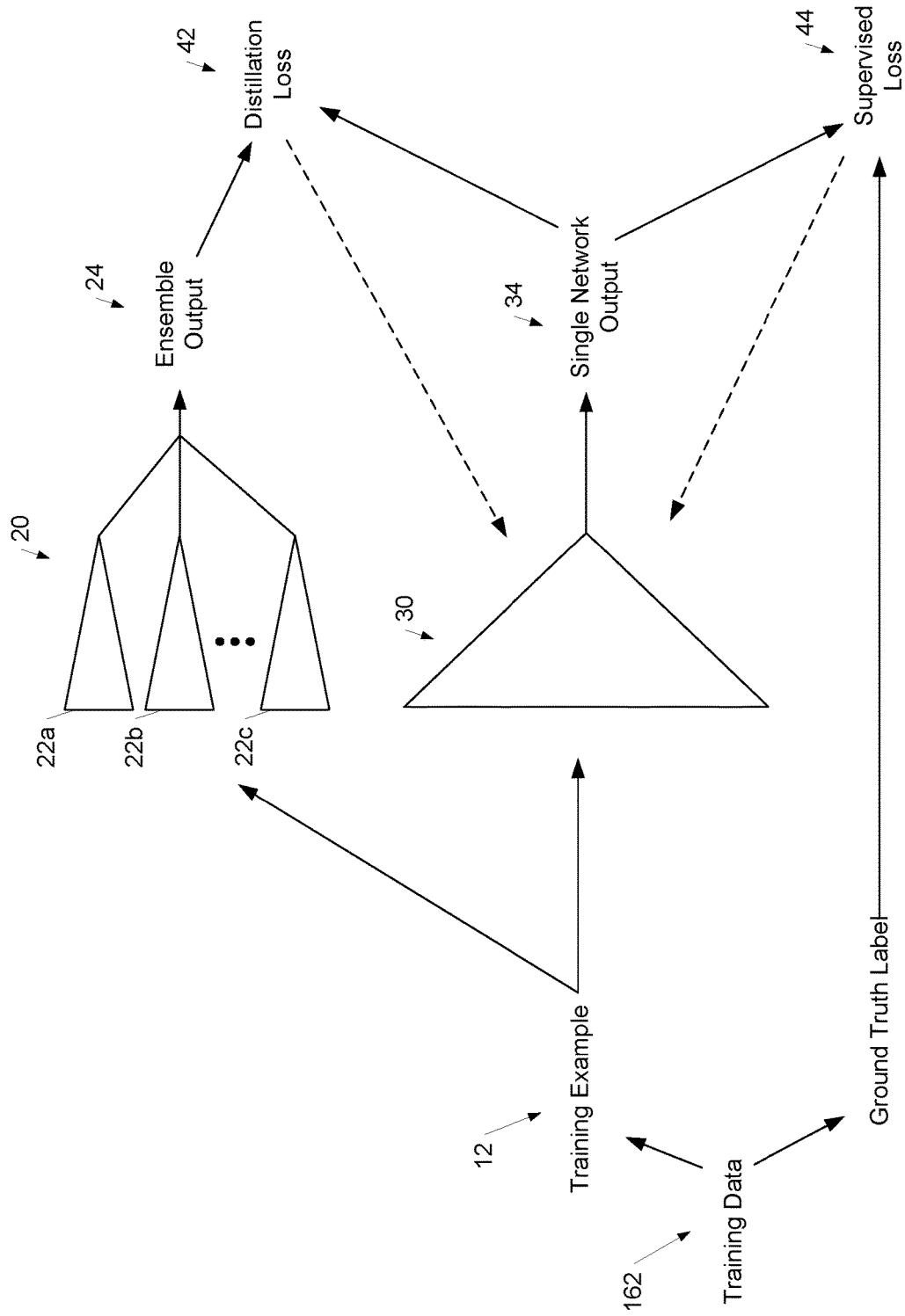
FIG. 1A depicts a block diagram of an example scheme to train a single neural network with improved reproducibility according to example embodiments of the present disclosure.

Reference numerals that are repeated across plural figures are intended to identify the same features in various implementations.

DETAILED DESCRIPTION

Overview

Generally, the present disclosure is directed to systems and methods that improve the reproducibility of neural networks by distilling from ensembles. In particular, aspects of the present disclosure are directed to a training scheme that utilizes a combination of an ensemble of neural networks and a single, "wide" neural network that is more powerful (e.g., exhibits a greater accuracy) than the ensemble. Specifically, the output of the ensemble can be distilled into the single neural network during training of the single neural network. For example, the output of the ensemble can be distilled into the single neural network alongside a supervised training loss that focuses on optimizing an accuracy of the single neural network. A temperature parameter can control the balance/relative weighting between these two objectives. For example, distillation from the weak (ensemble) model to the stronger (wider) model can be done at low strength relative to the other loss components, thereby enabling the single wide model to maintain superior accuracy while still achieving some gains in reproducibility.

After training, the single neural network can be deployed to generate inferences. In such fashion, the single neural model can provide a superior prediction accuracy while, during training, the ensemble can serve to influence the single neural network to be more reproducible. In another example, both accuracy and reproducibility can be improved by distilling a combination of the wide model and the ensemble into a limited resources narrow model which is then deployed. Additional improvements in reproducibility can be gained by decorrelating the components of the ensemble while training to diversify them from one another. Additionally or alternatively to decorrelation during training, further diversification of ensemble components can be attained by using different sets of features and/or hyperparameters for each ensemble component.

While example discussion is given for "wide" neural networks relative to "narrow" neural networks, example aspects described herein are also applicable to "deep" networks relative to "shallow" networks. In particular, in either scenario, distillation can occur from an ensemble of one or more weaker networks (e.g., a less accurate narrow and/or shallow network with fewer parameters) to a stronger network (e.g., a more accurate wide and/or deep network with more parameters).

Example implementations of the proposed techniques may be particularly advantageous in cases where the data is randomly shuffled between training different networks. For example, if one model is trained with one random shuffling of the data, while the other with another, distilling from a more reproducible ensemble can benefit the receiving network more substantially than other techniques. As such, example implementations can perform ensembling of a plurality of narrow networks and distilling a loss from the ensemble to a wide or narrow single network where two different models included in the ensemble train on data arriving in different orders.

Example Discussion of Irreproducibility

In recent years, the use of neural networks (e.g., "deep" neural networks) has led to remarkable results in classification, prediction, and other machine learning problems. The availability of large amounts of labeled data makes it possible to train such networks to predict, classify, or solve other problems with amazing accuracy.

A typical supervised learning system has a set of labeled examples which are used to train a model. Then, the trained model is deployed to predict the labels of previously unseen examples. An example can include different features that are present in or descriptive of the example. A labeled example has an associated label. The training process assigns values to the parameters of the model that are then used for prediction of labels for unseen examples.

In particular, in a typical deep learning system, the features are the input to a network and the labels are connected to its output. The inputs are connected to the output through a network of links. Each link is assigned a weight. In many cases, the links are arranged in layers. The layer closest to the features is typically the widest, and then the layers (typically, but not always) narrow towards the output. This structure can be referred to as a tower. At training stage, all weights of the network can be learned together.

In many deep network applications, once training is done, the model is fixed, and is deployed on some servers to be used to predict outputs for new, unlabeled examples. At this point, the model does not change, until a new model is deployed to replace it. However, in online learning, a model can be continuously trained, for example, by generating predictions on the next batch of unseen examples, observing the resulting outcomes, and then training on the difference.

Both offline and online learning can include solving an optimization problem that attempts to find the values for all parameters in the network that maximize some objective (e.g., minimize some loss). Training of neural networks is typically done by visiting all the labeled training examples, possibly iterating through the examples multiple times (epochs).

Training is often highly parallelized. As a result, if the same model is trained more than once, each time it is trained, training examples may be seen in a different order.

Additionally, many systems are distributed such that one set of servers is in charge of handling the learned weights, while another set of workers is in charge of handling the learning over examples. Due to the distribution and communication between different components of the distributed system, updates to the parameters may happen in random order.

Updates may also be applied asynchronously. For example, workers may use weights to which updates from some example already propagated combined with weights to which updates from the same example have still not propagated. In another example, some workers may use old stale weights which have not updated in a while, while simultaneously other workers are using more recently updated weights.

Each of these aspects of parallelism, distribution, and asynchronicity can result in the production of models that are irreproducible. For example, this may be due to or caused in part by the non-convexity of the objective with respect to all weights and the randomness in updates. Thus, models trained on the exact same data can diverge in their learned weights.

More critically, however, models may also diverge in their predictions on previously unseen examples. Specifically, for various tasks, there could be large prediction differences in the outcome predicted for the same example by two supposedly identical models that were trained identically over the same set of training examples. Such prediction difference can happen even if the models have identical architecture, identical hyperparameters, and were trained on exactly the same set of training examples.

This divergence in prediction can affect models in even more severe ways when these models are actually used to determine the next outputs to provide for an unseen input (e.g., items of content to provide in response to an unseen query). In this case, diverging models can select different outputs, leading (e.g., in online learning systems) to complete divergence of one model from the other, even if they have both trained on the same example sets initially and used the same architecture and hyperparameters. Specifically, when new outputs are selected and then learned upon, the respective sets of examples over which the models have trained also becomes different.

In offline batch training, this problem can be mitigated to some extent by training a set of supposedly identical models over the same data, and then selecting the best one on some validation set for deployment. However, in online learning, where the model predicts on the next batch of unseen examples, and then trains on them, this methodology is highly impractical. This is because the current best model can change from one batch to the other and maintaining and redeploying multiple copies of supposedly the same model is usually infeasible. Furthermore, each copy of the model may have converged to be best performing on some slice of the data, and none of the copies may be good enough independently for all the data.

Another source of complexity in certain neural network systems used for textual or other categorical inputs is the fact that, from the feature perspective, these models are different from typical image models. Image models have shown great success using deep networks. Image networks often use inputs which are the pixels in the image. Unlike images, the input features for prediction tasks dealing with text or other categorical inputs are mostly non-measurable features, like a query, unigrams, and similar. These features do not take numerical values. Instead, popular embedding techniques, adapted from language deep networks, are often used to map such features to measurable features which are points in some higher dimensional space. The embedding procedure places unmeasurable features in some embedding space according to their effect on the objective. Features that have similar effects are placed closer to each other, while features that have different effects are more distant. Learning the location of the point in the space can be done in tandem with training the rest of the weights in the network and may also be a heavy contributor to the irreproducibility of the model.

Example Discussion of Enhanced Reproducibility Via Ensembles

It has been shown that using an ensemble of models rather than a single model can mitigate irreproducibility and reduce the prediction difference exhibited by different trained versions of the same ensemble. Thus, in an ensemble approach, several independent towers can be trained instead of a single tower and the final prediction from the ensemble is an aggregation of the predictions of the component towers (e.g., averaged, combined via a voting scheme, etc.). By aggregating the outputs from multiple different towers, the prediction variance can be reduced. Through this effect, use of an ensemble improves the reproducibility of the models, making predictions of two independently trained ensembles diverge less from one another.

However, while improving reproducibility, ensembles are costly (e.g., in the sense of both loss of accuracy and increased computational complexity). In particular, due to nonconvexity, ensembles can actually produce predictions that are less accurate than those of a wide single tower model that uses the same computational resources (e.g., has the same number of parameters and multiplications as the ensemble). Thus, use of an ensemble rather than a single model (of the same relative size) represents a tradeoff of accuracy in favor of reproducibility.

Ensembles are also more complex to deploy, particularly in specialized hardware that is set for basic matrix multiplications of a deep network. For example, deploying ensembles can require performing duplicate actions to run each component model and then performing additional actions to combine the multiple predictions. Ensembles can also produce biases. For example, if an ensemble is optimized for log-loss or cross-entropy, and the aggregation of outputs is performed in logit space, the ensemble average will under-predict and a calibration model will potentially be necessary to offset the bias. In all, deploying ensembles, besides degrading accuracy, produces technical debt that can affect the complexity and robustness of the system, as well as make it harder to iterate on system improvements. Thus, use of an ensemble rather than a single model requires increased use of computational resources such as processor and memory usage to produce the same prediction.

Example Discussion of Distillation

Another concept within the machine learning space is that of "distillation." Typical distillation approaches train a high complexity (e.g., more parameterized) deep network teacher model and distill its predictions to a lower complexity (e.g., less parameterized) student model to generate a stronger simpler student model which can then be deployed. The student model is often trained on a combination of both the true labels and the predictions of the teacher model. Thus, the student model will learn the true labels but also learns to predict more like the more complex teacher model. This technique can be used to improve the accuracy of models where there are limited resources in deployment. While the simpler student model is usually still not as accurate as the more complex teacher model, its accuracy does benefit from learning from the teacher model. Thus, distillation from a more complex teacher to a simpler student improves the accuracy of the student versus the accuracy the student model would produce if trained with no additional side information.

Example Techniques to Improve Reproducibility Via Distillation from Ensembles

The present disclosure proposes techniques which obtain the benefits of both improved accuracy and improved reproducibility. In particular, instead of training and deploying an ensemble (which, as described above, has reduced accuracy, increased computational requirements, and higher maintenance and technical complexities relative to a single model of comparable size), the present disclosure proposes to train and deploy a single neural network. However, according to an aspect of the present disclosure, the single neural network can also be trained to be more reproducible by distilling from an ensemble to the single neural network during training of the single neural network. In particular, the prediction of an ensemble can be distilled to a single neural network that is more powerful/accurate than the ensemble, so that the accuracy benefits of the single neural network are combined with the reproducibility benefits of the ensemble. The single neural network can be deployed, reducing the technical debts and complexities as compared to deploying an ensemble. Thus, the proposed scheme moves the complexity to cheap training resources and away from expensive deployment resources, thereby representing an improved allocation of tasks among available resources.

As an example, FIG. 1A depicts a block diagram of an example scheme to train a single neural network with improved reproducibility according to example embodiments of the present disclosure. Specifically, FIG. 1A illustrates an ensemble 20 that includes a plurality of neural networks 22a, 22b, 22c. Although three networks are shown in the ensemble 20, the ensemble can include any number of networks that is 2 or greater.

FIG. 1A also illustrates a single neural network 30. According to an aspect of the present disclosure, the single neural network 30 can be selected, designed, or otherwise configured to exhibit greater accuracy than the ensemble 20 when trained and evaluated on a common dataset. Thus, the single neural network 30 can provide accuracy benefits relative to the ensemble 20. Many different techniques, architects, hyperparameters, etc. can be used to generate a single neural network 30 that exhibits greater accuracy than an ensemble 20.

As one example, to ensure that the single neural network 30 is more accurate than the ensemble 20, the single neural network 30 can have an equal or greater number of parameters than the ensemble 20. Thus, a first number of parameters included in the single neural network 30 can be greater than or equal to a second number of parameters cumulatively included in the plurality of neural networks 22a-c of the ensemble 20.

As another example, to ensure that the single neural network 30 is more accurate than the ensemble 20, the deployment complexity (e.g., which is a function of the number of multiply-add operations required to be performed) of the single neural network 30 can be greater than or equal to the ensemble 20. Thus, a first number of multiply-add operations associated with running the single neural network 30 can be greater than or equal to a second number of multiply-add operations associated with running the plurality of neural networks 22a-c of the ensemble 20.

FIG. 1A shows a training scheme in which the single neural network 30 is trained, at least in part, to mimic the output of the ensemble 20 (which, as described) has less variance. Stated differently, the output of the ensemble 20 can be distilled into the single neural network 30.

Specifically, as illustrated in FIG. 1A, a set of training data 162 can include a number of training pairs. Each training pair can include a training example 12 and a ground truth label 14 associated with the training example 12. In the illustrated scheme, the training example 12, is supplied as input to the single neural network 30 and also to each component model 22a-c of the ensemble 20. In some implementations, an entirety of the features of the training example 12 are supplied to each component model 22a-c. In other implementations, to increase diversity within the ensemble 20, different overlapping or non-overlapping subsets of the features of the training example 12 can be respectively supplied to the different component models 22a-c of the ensemble 20.

Furthermore, in some implementations, to increase diversity within the ensemble 20, the component models 22a-c of the ensemble can be decorrelated from each other during training of the ensemble 20. For example, techniques that can be used to perform decorrelation among models are described in U.S. patent application Ser. No. 16/338,430, which is hereby incorporated by reference in its entirety.

The ensemble 20 can process the training example 12 to generate an ensemble output 24 based on the training example 12. For example, the ensemble output 24 can be an aggregate (e.g., average, majority vote, etc.) of the respective outputs of the component models 22a-c. Similarly, the single neural network 30 can process the training example 12 to generate a network output 34 based on the training example 12. In some implementations, the network output 34 can be a single output for all "labels" (e.g., true, and distilled) or multiple outputs, where each output is matched to one or more of the available labels. Further discussion in this regard is provided with reference to FIG. 1B.

As is generally performed for supervised learning, a supervised loss 44 can be generated based on a comparison of the network output 34 and the ground truth label 14. Thus, the supervised loss 44 can penalize differences between the network output 34 and the ground truth label 14. Or, it can be defined as a difference based loss between values computed by the teacher and the respective ones computed by the student, including logit values in the top head. As is described below, in some implementations, a supervised loss can also be evaluated between the ensemble 20 and the ground truth label 14. This can be done at the same time as the student 30 is training or in other implementations ahead of the student's training time. However, both methods are possible.

In addition to distilling at the top output level, distillation can also be performed at any level in the network, including single neuron activation values. For example, instead of distilling the top head, an implementation can apply the distillation on the values of all neurons in a hidden layer, which are distilled from an average or some computation for that layer in the ensemble 20 to a matching layer in the student single tower 30.

According to an aspect of the present disclosure, in addition or alternatively to the supervised loss 44, a distillation loss 42 can be generated based on a comparison of the network output 34 and the ensemble output 24. The distillation loss 42 can be computed for the final predictions of the network 30 and the ensemble 20 or can be computed at an earlier stage (e.g., in the logit space). Thus, the distillation loss 42 can penalize differences between the network output 34 and the ensemble output 24.

In particular, for the distillation loss 42, variations of objectives can be used to apply the ensemble's prediction to the single neural network. One example loss function uses the log-loss of the single neural network with respect to the ensemble output 24 which is the prediction of the ensemble 20. Another example loss function combines this with an L2 distance between the labels predicted by the ensemble 20 and the single neural network 30. Another example loss function applies an L2 loss between the log-odds score $S_s$ of the single neural network 30 and that of the ensemble 20 $S_t$, i.e., $$L_{dist} = \|S_s - S_t\|^2$$

The distillation loss 42 (e.g., in combination with the supervised loss 44) can be used to train the single neural network 30. For example, the distillation loss 42 (e.g., in combination with the supervised loss 44) can be backpropagated through the single neural network 30 to update the values of the parameters (e.g., weights) of the single neural network 30. This can be done by itself (without including the supervised loss 44) or in superposition with the supervised loss 44.

In some implementations, the ensemble 20 is held fixed (e.g., not trained) during the training process illustrated in FIG. 1A. For example, the ensemble 20 can have been pre-trained and its outputs during such pre-training simply stored and later used to train the single neural network 30. However, in other implementations, the ensemble 20 can be jointly trained with the single neural network 30 using an ensemble loss function (not shown) that compares the ensemble output 24 to the ground truth label 14. When the ensemble 20 is pre-trained, there is a reproducibility "advantage" where different student models (e.g., network 30) are distilled to the same teacher prediction. This forces the predictions to be more similar and closer to the same optima. When the ensemble 20 is trained together with the student (e.g., network 30), each retrain of the student is distilled to a different teacher value. This helps reproducibility without forcing the models to a certain local optima.

In some implementations, the single neural network 30 can be trained (or pre-trained) for some amount (e.g., using only the supervised loss 44) prior to engaging in the training scheme illustrated in FIG. 1A. This can enable the single neural network 30 to first learn to provide the highest accuracy possible, which can then be tempered with the reproducibility benefits of the distillation from ensemble 20 as shown in FIG. 1A.

In some implementations, distillation to the teacher ensemble prediction can be performed throughout all training examples, and in other implementations (e.g., depending on system considerations), it can be limited to only a subset of training examples.

In some implementations, a loss function used to train the single neural network can have the distillation loss 42 and the supervised loss 44 as component terms of the loss function. In some of such implementations, the loss function can have a temperature parameter ($\tau$) that controls a tradeoff between the distillation loss term and the supervised loss term. As one example, the loss function can be as follows: Total Loss=(Distillation Loss·$\tau$)+(Supervised Loss·(1−$\tau$)).

In some implementations, and based on example empirical evaluations, the temperature parameter can have a value of about 0.1 (e.g., a value less than or equal to 0.1). Or the temperature parameter can have another relatively small value that is enough to improve reproducibility without hurting the accuracy of the wide model.

In some implementations, the temperature parameter for the ensemble teacher can be low relative to that of the label loss or to that of the accuracy wide teacher. Having a low value for the reproducibility teacher can assist in sustaining accuracy while obtaining the reproducibility benefits.

In some implementations, during application of the training scheme illustrated in FIG. 1A over a number of different training examples, the temperature parameter can be modified over time to increase over time a relative influence of the distillation loss 42 relative to the supervised loss term 44 (e.g., ramp $\tau$ from 0 to 0.1 over the course of training). In such fashion, initially training is done only on the true label, and only after the ensemble and/or the single neural network has seen some data is the distillation loss applied in training of the wide tower. Thus, since the student 30 is expected to have better accuracy, the purpose of distillation here is to distill reproducibility. This can be done with relatively small $\tau$. Therefore, $\tau$ can be kept small to prevent degradation of the student's accuracy, while still obtaining the reproducibility benefit.

Example losses include log loss, cross entropy, L2, or other losses. Distillation can occur either on the top level prediction, or in the logit value with L2 loss, or at different points in the network. Thus, distillation loss can be applied on different units in the network, that match those of the ensemble teacher, for example, distillation can occur between all units in some layer of neurons averaged in the ensemble to an identical layer in the single tower network, where loss is applied between pairs of corresponding neurons on the single tower network.

After the training process shown in FIG. 1A, the single neural network 30 can be deployed to generate inferences. For example, the single neural network 30 can be deployed at a server or can be sent to a user device and implemented "on-device" at the user's device. In some implementations, the single neural network 30 can be deployed in an online learning scheme in which it is continuously or periodically updated based on examples seen during deployment of the network 30.

Thus, FIG. 1A shows a process that enables deployment of a model that uses all computational resources as an accurate wide single network 30, but during training is distilled from an ensemble 20. The deployed (student) model 30 takes the accuracy benefit of the wide model 30 but can be more reproducible because of the better reproducibility of the ensemble 20.

Referring again to the ensemble 20 of FIG. 1A, the component models 22a-c may be the same or different from each other. As examples, FIG. 2A depicts a block diagram of a scenario in which the networks of an ensemble are identical while FIG. 2B depicts a block diagram of a scenario in which the networks of an ensemble are non-identical.

Figure 2A:
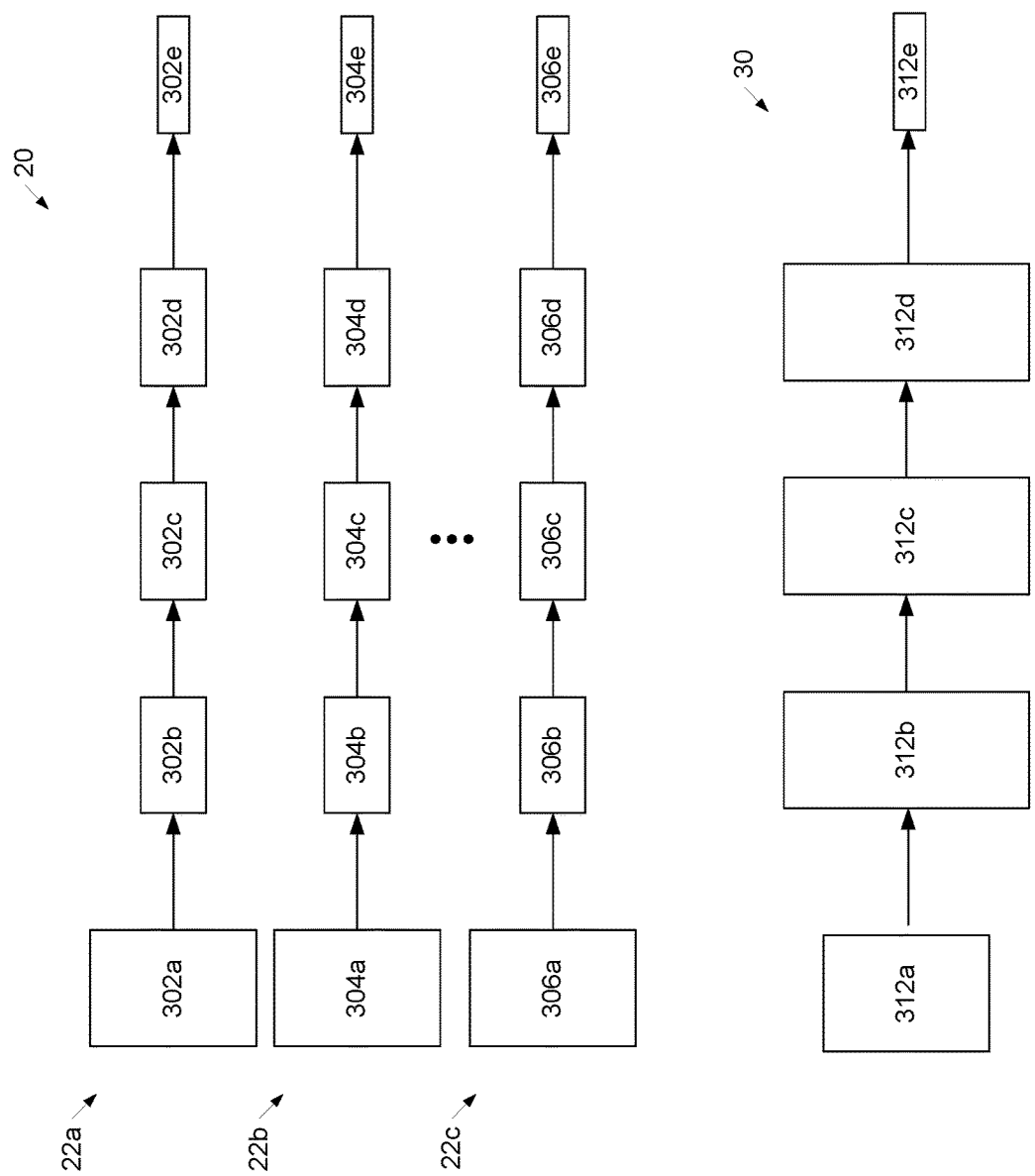
FIG. 2A depicts a block diagram of a scenario in which the networks of an ensemble are identical according to example embodiments of the present disclosure.
Figure 2B:
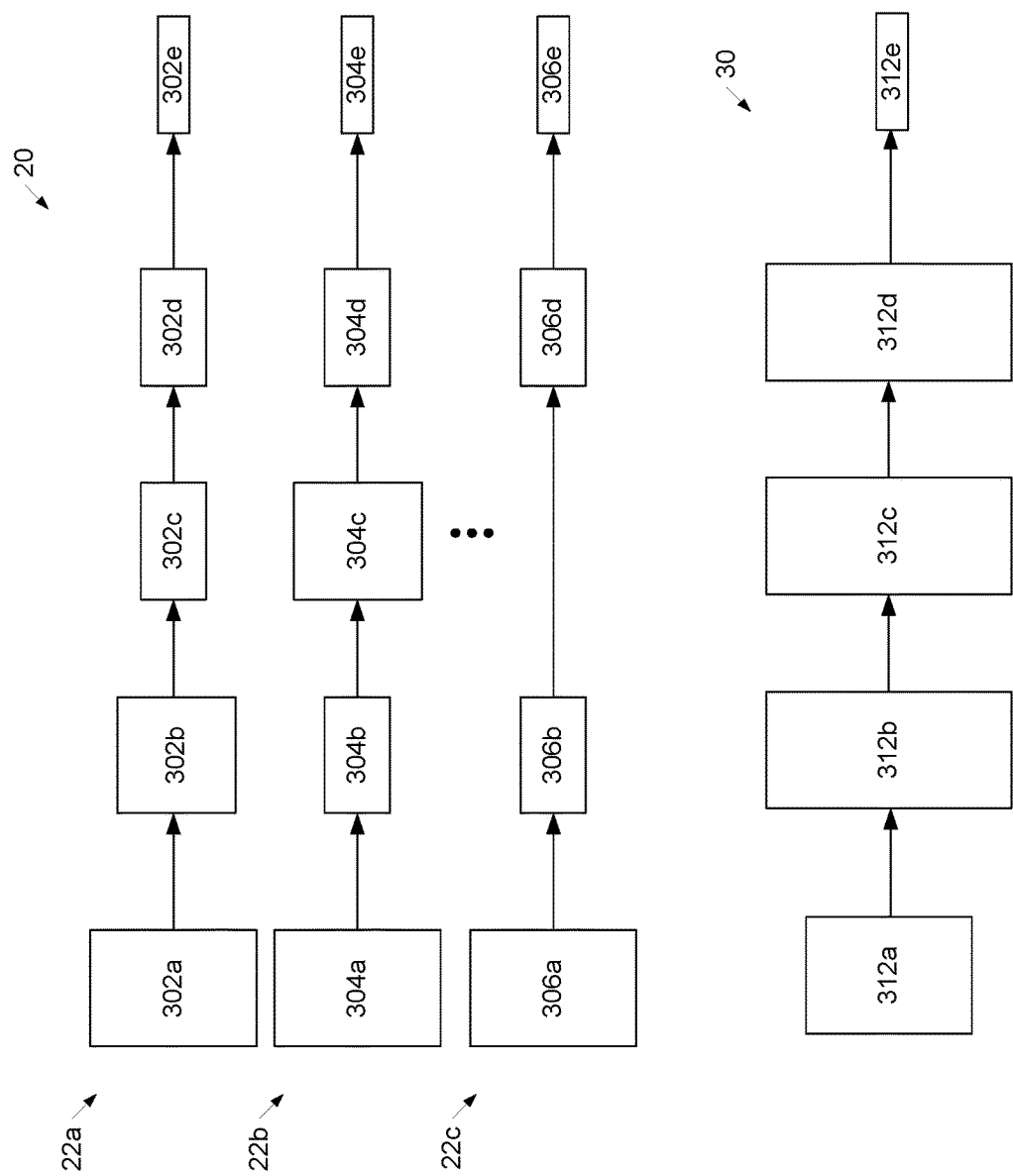
FIG. 2B depicts a block diagram of a scenario in which the networks of an ensemble are non-identical according to example embodiments of the present disclosure.

In particular, referring first to FIG. 2A, it can be seen that each of the component models 22a-c has a set of layers including an input layer, an output layer, and one or more hidden layers (shown here as three, for example) between the input layer and the output layer. For example, model 22a has input layer 302a, output layer 302e, and hidden layers 302b-d; model 22b has input layer 304a, output layer 304e, and hidden layers 304b-d; and model 22c has input layer 306a, output layer 306e, and hidden layers 306b-d. As shown in FIG. 2A, each of the corresponding layers in each component model 22a-c is identical the corresponding layers in the other component models 22a-c. Thus, for example, hidden layer 302b of model 22a is identical (e.g., in the sense of width and other architectural hyperparameters, but not necessarily the actual parameter values) to hidden layers 304b and 306b of models 22b and 22c, respectively. Stated differently, models 22a-c share an identical architecture (but again may have different parameter values).

Also as illustrated in FIG. 2A, the single neural network 30 can have a similar architecture, except that the hidden layers of the network 30 are larger than the corresponding hidden layers of the ensemble component models 22a-c. Specifically, the single neural network 30 has an input layer 312a, an output layer 312e, and a number (e.g., shown as three for example) of hidden layers 312b-d between the input layer 312a and the output layer 312e. The input layer 312a and output layer 312e can be the same size as the input and output layers of the component models 22a-c. However, the hidden layers 312b-d of the network 30 can be larger than the hidden layers of the component models 22a-c.

In particular, as one example, each of the hidden layers 312b-d of the single neural network 30 can have a width that is equal to a width of a corresponding hidden layer of the plurality of component models 22a-c multiplied by a square root of a number of component models included in the ensemble 20. Thus, as one example, hidden layer 312c of network 30 can have a width that is equal to the width of hidden layer 306c of model 22c multiplied by a square root of the number of component models included in the ensemble 20. This guarantees that the number of link weight parameters in the multiplication matrix that represents the hidden layer of the student network 30 is equal to the cumulative number of parameters in the ensemble teacher for the same layer.

The architectures shown in FIG. 2A are examples only. They component models of the ensemble are not required to be identical. For example, FIG. 2B shows a scenario where the component models 22a-c of the ensemble 20 are different from each other (e.g., have different architectures and/or different hyperparameters). For example, as illustrated in FIG. 2B, component model 22a has a hidden layer 302c that has a different width that the corresponding hidden layer 304c of component model 22b. As another example, component model 22c does not have a layer that corresponds to 302c or 304c.

Example Discussion of Distillation into a Multi-Headed Model

Figure 1B:
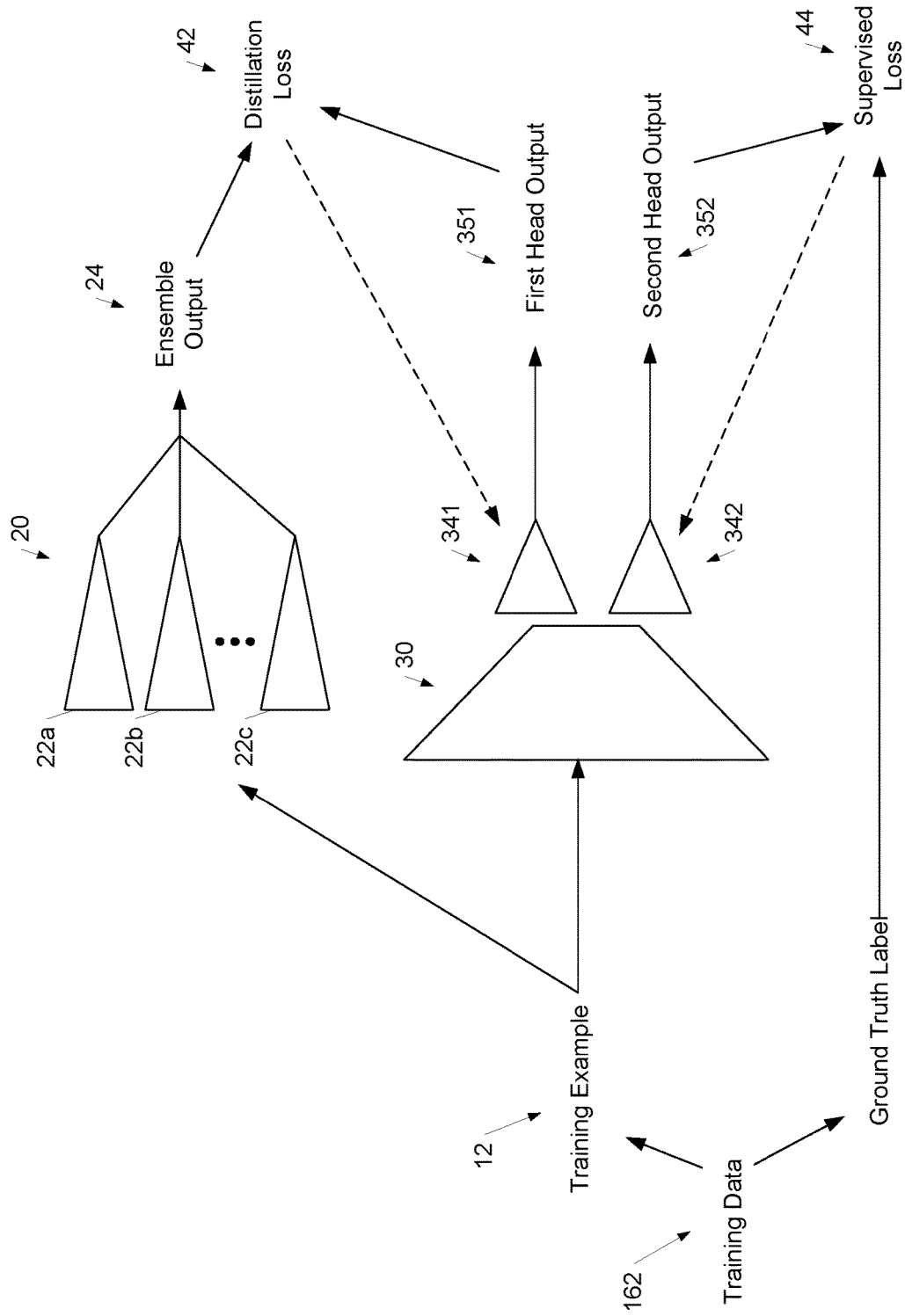
FIG. 1B depicts a block diagram of an example scheme to train a single multi-headed neural network with improved reproducibility according to example embodiments of the present disclosure.

FIG. 1A shows the student model 30 as having a single output head. However, the scheme shown in FIG. 1A can also be applied to student models with multiple heads (i.e., a "multi-headed" model). One example of this is illustrated in FIG. 1B. In FIG. 1B, the student model 30 has multiple heads, shown in FIG. 1B as a first head 341 and a second head 342. Although two heads are shown, any number of different heads can be used. Each head can generate a respective output. For example, the first head 341 generates a first head output 351 while the second head 342 generates a second head output 342. In the illustrated scheme, the first head 341 can be trained on the ensemble output 24 via the distillation loss 42 while the second head 342 can be trained on the ground truth label 14 via the supervised loss 14. In other examples, some or all of the two or more heads can each be trained on both the distillation loss 42 and the supervised loss 44, but with different respective temperature parameters (e.g., one head may be weighted more for learning reproducibility while another head may be weighted more for learning accuracy). At inference time, some or all of the heads can be deployed and/or used. For example, one of the heads can be selected that represents/effectuates a desired tradeoff between accuracy and reproducibility.

Example Discussion of Distillation from Multiple Teachers to a Smaller Model

According to another aspect of the present disclosure, the above concepts can be extended to situations where it is desired to deploy only smaller models. In particular, in some additional implementations, both an ensemble and a wide model can be distilled to a smaller model. Each component provides the smaller model with its benefit (either accuracy or reproducibility). The approach can be further enhanced by leveraging other methods to diversify the ensemble to improve reproducibility even more. As another example, legacy models can be leveraged for this method as described elsewhere herein.

Thus, if resources are limited in the deployment environment, the approach shown in FIG. 1A can be taken one step farther. Both an ensemble and a wide tower can be distilled to a narrower tower. The wide tower is used to generate better accuracy, and the ensemble is used to provide better reproducibility.

Figure 3A:
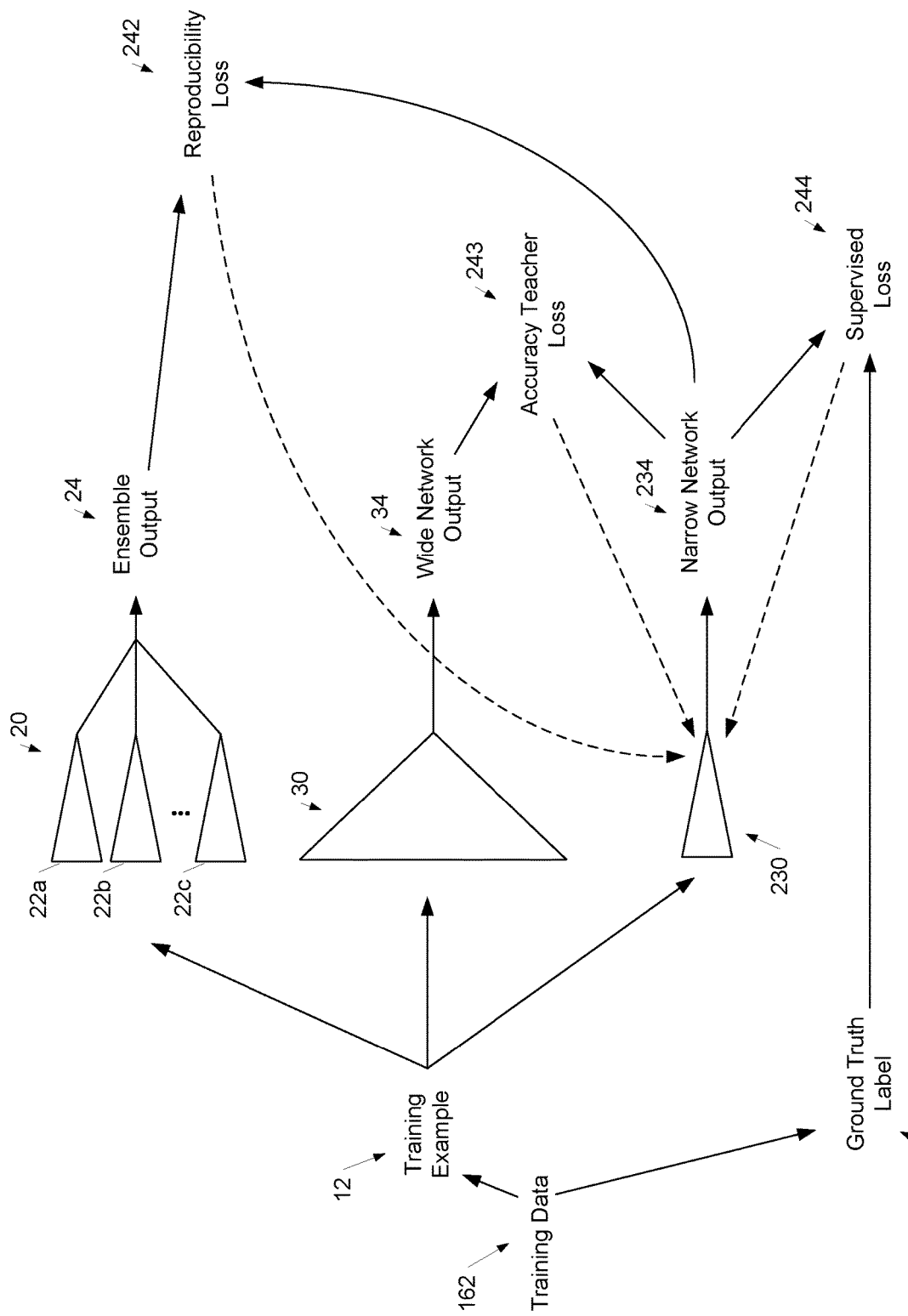
FIG. 3A depicts a block diagram of an example scheme to train a narrow neural network with improved accuracy and reproducibility according to example embodiments of the present disclosure.

More particularly, FIG. 3A depicts a block diagram of an example scheme to train a narrow neural network with improved accuracy and reproducibility according to example embodiments of the present disclosure. As illustrated in FIG. 3A, both the ensemble and a single (wide) network 30 can be distilled into a single (narrow) network 230. The narrow network 230 can be smaller (e.g., in number of parameters, number of multiply-adds, etc.) than either the ensemble 20 or the wide network 30. However, the student network 230 does not have to be smaller than the teacher network 30. The illustrated scheme can be used to distill to a single tower that is as wide as the accuracy teacher.

As illustrated in FIG. 3A, the narrow network 230 can also receive and process the training example 12 to generate a narrow network output 234. A reproducibility loss 242 can penalize a difference between the narrow network output 234 and the ensemble output 24; an accuracy teacher loss 243 can penalize a difference between the narrow network output 234 and the wide network output 34; and (optionally) a supervised loss 244 can penalize a difference between the narrow network output 234 and the ground truth label 14.

Figure 3B:
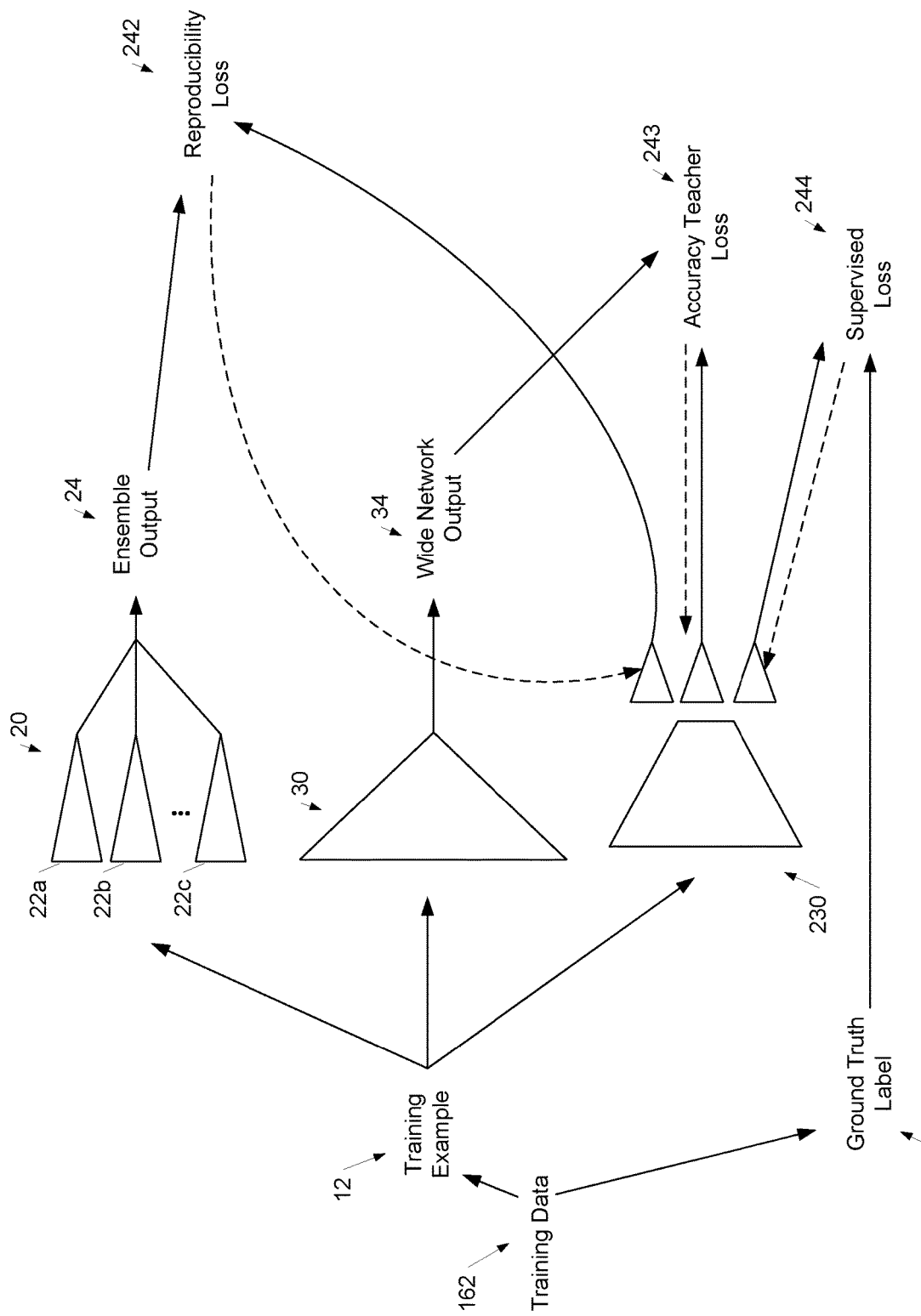
FIG. 3B depicts a block diagram of an example scheme to train a multi-headed narrow neural network with improved accuracy and reproducibility according to example embodiments of the present disclosure.

The losses can be computed at the same network head as in FIG. 3A, or can be applied to separate network heads (see, e.g., FIG. 3B). The losses can be computed on the network head, or on all components of some layer that is equal width between the teachers and students.

In one example, the total loss can be computed similarity to the first case, but with different temperature parameters for each component. For example, one example distillation loss function (e.g., which combines distillation from both teachers) is as follows:

$$L_{dist} = \tau_e \|S_s - S_e\|^2 + \tau_w \|S_s - S_w\|^2$$

where the subscript e denotes the ensemble teacher 20, the subscript w denotes the wide single network teacher 30, and the subscript s again denotes the student, which in this scenario is the narrow network 230. In some implementations, the distillation loss is backpropagated in training only to the narrow network 230 and not the teachers as before. Again, different loss variants can be used: The L2 loss described here is one example, but different losses can be applied instead.

More generally, the distillation loss (e.g., the reproducibility loss 242 combined with the accuracy teacher loss 243) can be added to the supervised training loss 244 of the student network 230 as before. However, here distillation is combined from two types of teachers. One, the wide model 30, has larger capacity and better accuracy. It is expected to have a better loss than the student 230. Therefore, it should be distilled with larger strength, as it is expected to improve the accuracy of the student.

The ensemble teacher 20 is expected to have better accuracy than the student only if it has better capacity than the student. That is the case if the component towers of the ensemble 20 are equal in architecture to the student. However, if the student 230 is wider to the point it has the same number of multiplication as the ensemble 20, it is expected to have better accuracy than the ensemble 20. In such a case, the ensemble 20 is used mainly to produce reproducibility. To prevent degradation of the deployed student 230, the strength of the distillation loss can be kept relatively small. The reproducibility benefit can be obtained with such small loss, with smaller degradation to accuracy.

Furthermore, the scheme shown in FIG. 3A can be extended in a similar way as the scheme from FIG. 1A was extended to FIG. 1B. That is, although FIG. 3A shows the narrow network 230 with a single head, the narrow network 230 can have multiple heads. The heads can be separately trained on the different losses 242, 243, and 244 or can be trained on different respective weightings thereof (e.g., each head can have different temperature parameter values). See, for example, FIG. 3B.

Example Discussion of Diversity Among the Ensemble Components

The improved reproducibility exhibited by ensembles is achieved in part because the individual towers differ from one another. The more different they are, the better the reproducibility. Decorrelating the outputs of the ensemble has been shown to improve reproducibility beyond the improvements of the ensemble. See U.S. patent application Ser. No. 16/338,430, which is hereby incorporated by reference in its entirety. The approach described in U.S. patent application Ser. No. 16/338,430 can be used on the components of the ensemble during learning of the ensemble. If, as illustrated in FIG. 1A, only the ensemble is used as the teacher, the prediction of the component towers can be decorrelated over batches of examples (or continuously over the training set). If, however, as illustrated in FIG. 3A, both an ensemble and a wider tower are used as teachers, all the component teacher towers can be decorrelated from each other (e.g., the wide teacher can be decorrelated from the ensemble components as well).

Let $C_t$ be a correlation matrix computed over the log-odds scores of all the teacher component towers. Then, a decorrelation loss can be added as follows:

$$L_{DeCor} = \frac{1}{2}[\|C_t\|_F^2 - \|\text{diag}(C_t)\|_2^2]$$

where $\|C_t\|_F$ denotes the Frobenius norm of the correlation matrix, and the diagonal elements are subtracted. This decorrelation loss can be applied in training of the teacher towers with some temperature parameter in addition to the true label based objective.

Another technique to diversity ensemble components focuses on modifying the ensemble components so that they differ from each other. For example, to benefit from an ensemble teacher, one aim is to make the towers of the teacher ensemble as different from one another as possible. It may be desirable, however, that they still attain almost similar accuracy to one another. Otherwise, the ensemble accuracy can be degraded. In such scenario, diversification can be achieved by selecting somewhat different feature spaces, changing architectures, and/or using different sets of hyperparameters for the components of the ensemble. Within these, different regularization strengths and/or methods can be used in each component tower of the ensemble. As another example, different drop-out schedules can be used for different components. Other modifications to training or architectural choices can be made as well (e.g., by substituting techniques that are different but roughly equivalent in results). This approach can be applied on the component towers of the ensemble teacher.

Another potential direction focuses on the use of legacy models for which historical predictions have been logged. In particular, legacy predictions made by past models can be used as the teacher ensemble. If such predictions are logged in the training pipeline, the logit scores of such models can be ensembled and use the ensemble as a teacher label. This can be done for improving either reproducibility and/or accuracy. Once such predictions are no longer available, the student model can continue training regularly. Historical results suggest that it is possible that some of the reproducibility gains obtained will be sustained even after this additional label is no longer available.

Example Devices and Systems

Figure 4A:
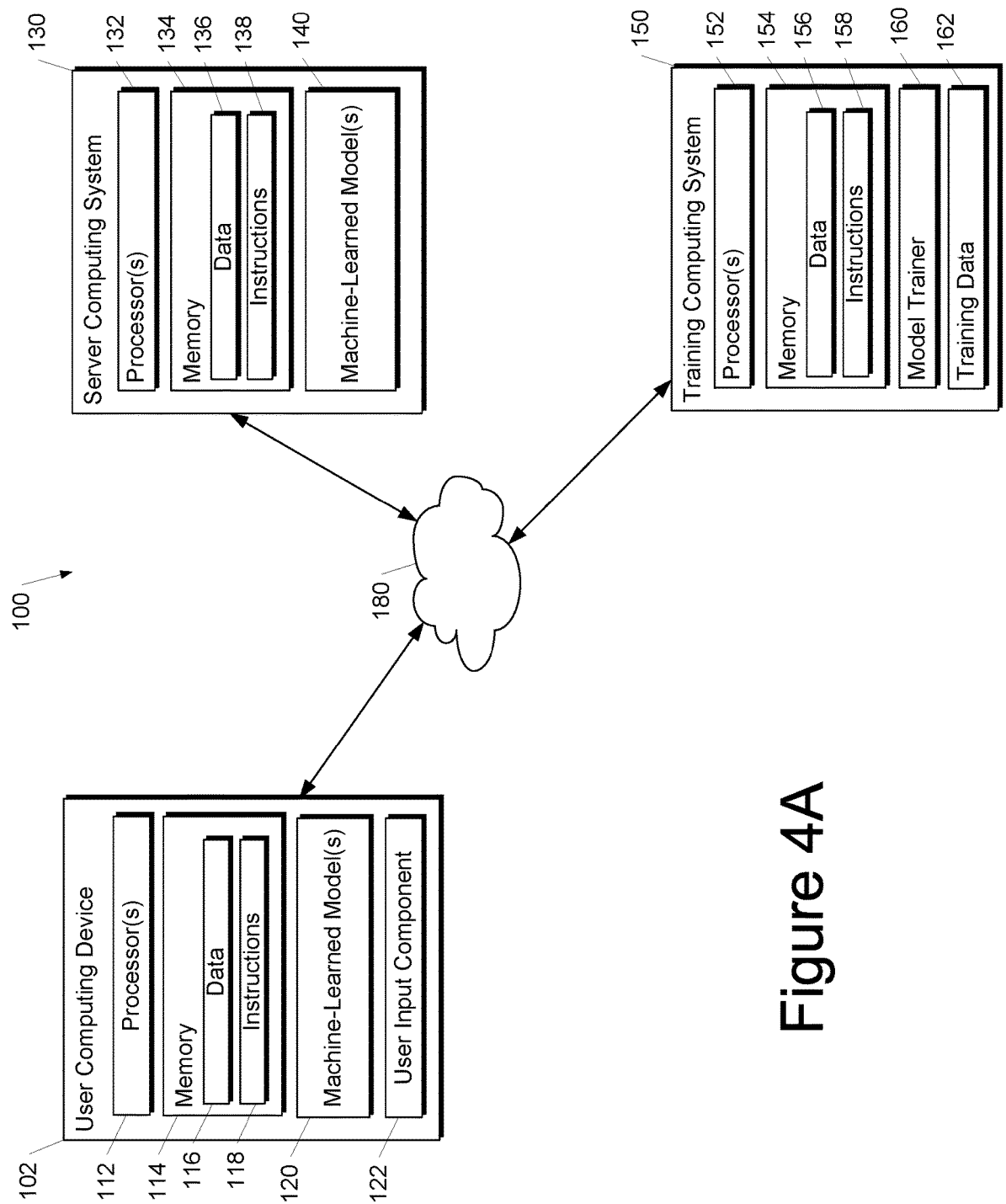
FIG. 4A depicts a block diagram of an example computing system that generates neural networks with improved reproducibility according to example embodiments of the present disclosure.

FIG. 4A depicts a block diagram of an example computing system 100 according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example machine-learned models 120 are discussed with reference to FIGS. 1-3.

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120.

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service. Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 1-3.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a set of training data 162. The training data 162 can include, for example, labeled training data or unlabeled training data.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 4A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 4B:
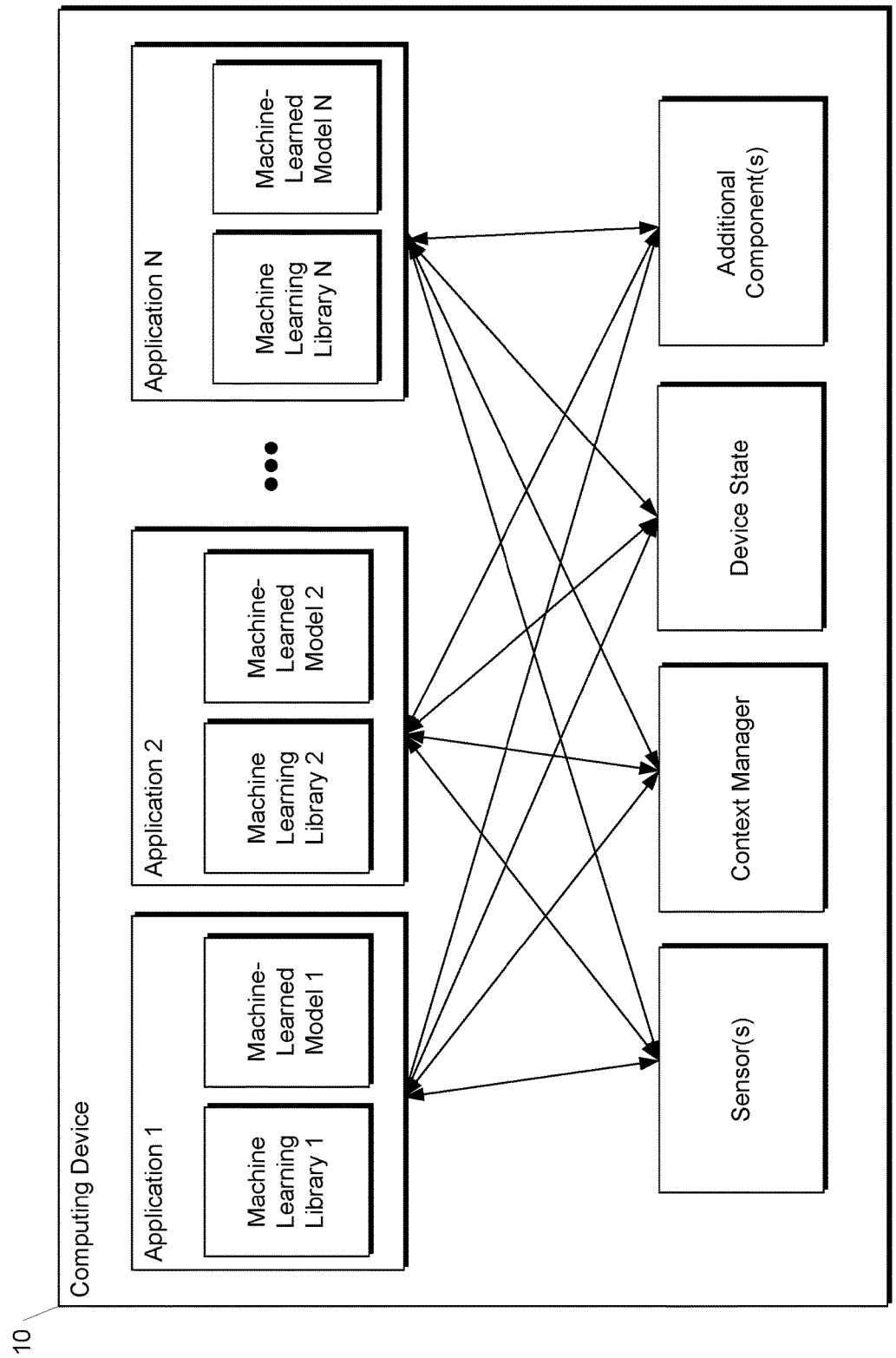
FIG. 4B depicts a block diagram of an example computing device according to example embodiments of the present disclosure.

FIG. 4B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 4B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 4C:
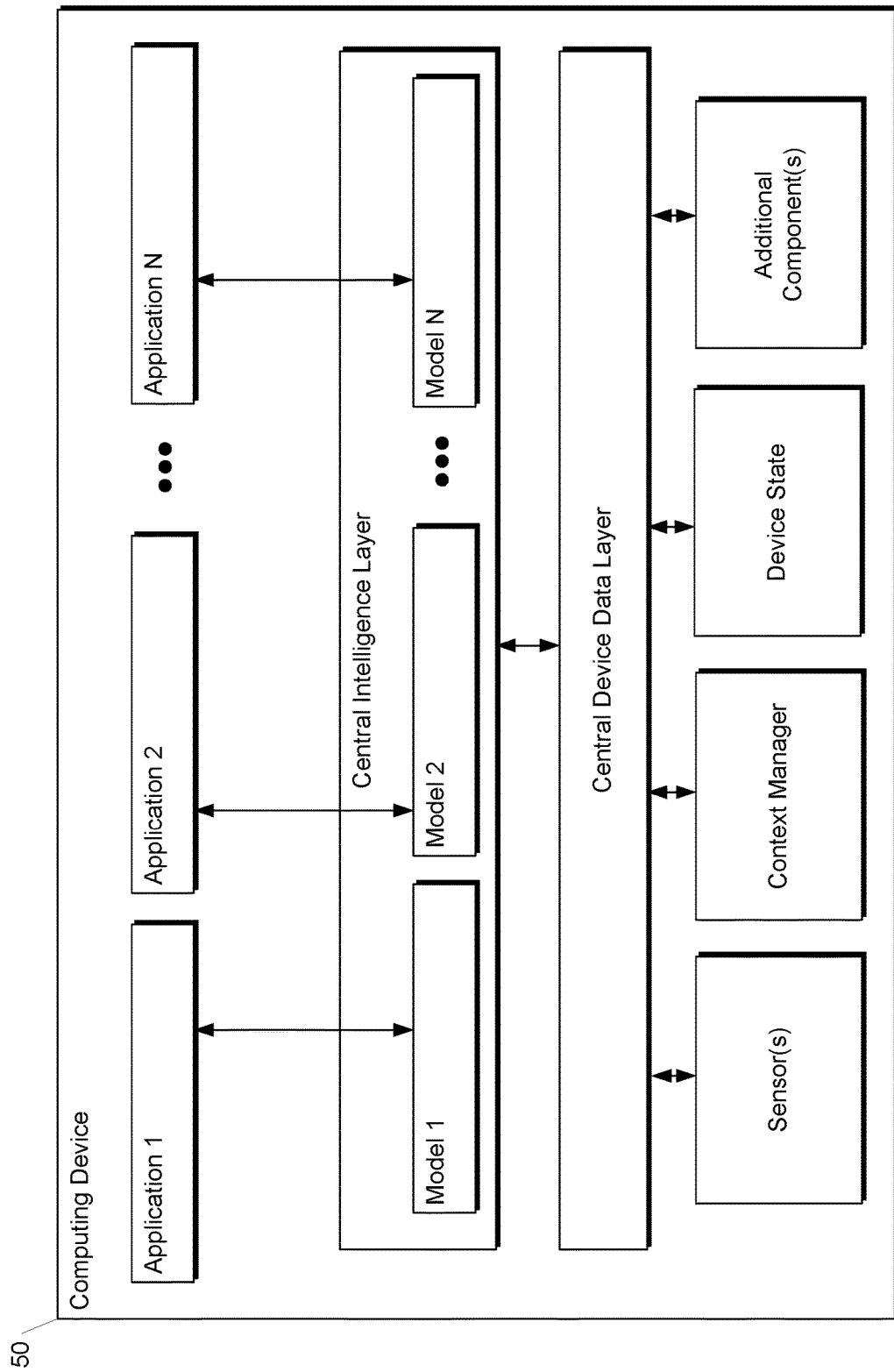
FIG. 4C depicts a block diagram of an example computing device according to example embodiments of the present disclosure.

FIG. 4C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 4C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 4C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Methods

Figure 5:
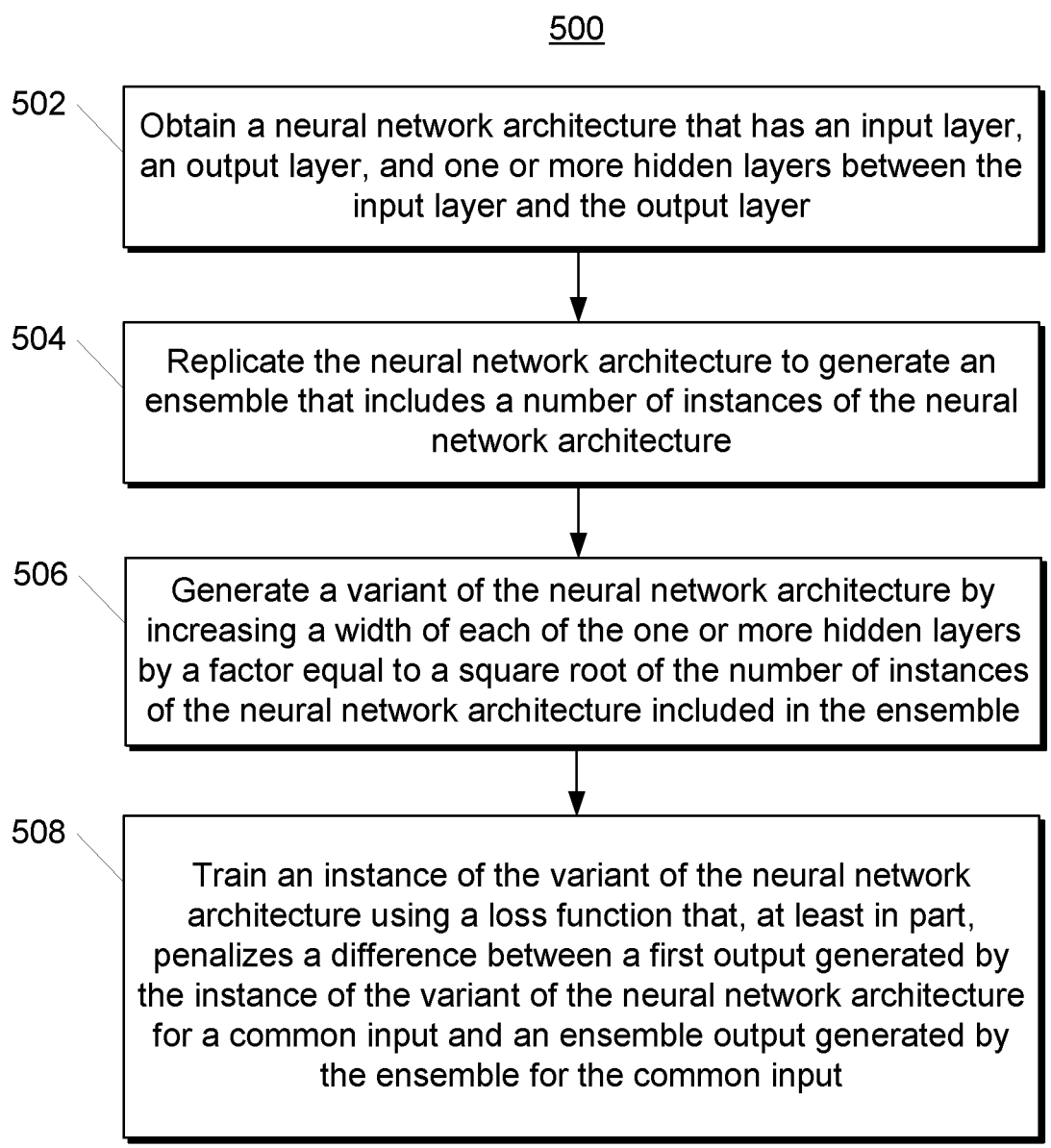
FIG. 5 depicts a flow chart diagram of an example method to train a single neural network with improved reproducibility according to example embodiments of the present disclosure.

FIG. 5 depicts a flow chart diagram of an example method to perform according to example embodiments of the present disclosure. Although FIG. 5 depicts steps performed in a particular order for purposes of illustration and discussion, the methods of the present disclosure are not limited to the particularly illustrated order or arrangement. The various steps of the method 500 can be omitted, rearranged, combined, and/or adapted in various ways without deviating from the scope of the present disclosure.

At 502, a computing system can obtain a neural network architecture that has an input layer, an output layer, and one or more hidden layers between the input layer and the output layer.

At 504, the computing system can replicate the neural network architecture to generate an ensemble comprising a number of instances of the neural network architecture. For example, FIG. 2A shows an ensemble comprising a number of instances of an identical neural network architecture.

At 506, the computing system can generate a variant of the neural network architecture by increasing a width of each of the one or more hidden layers by a factor equal to a square root of the number of instances of the neural network architecture included in the ensemble.

At 508, the computing system can train an instance of the variant of the neural network architecture using a loss function that, at least in part, penalizes a difference between a first output generated by the instance of the variant of the neural network architecture for a common input and an ensemble output generated by the ensemble based on the common input. During training, all inputs of the ensemble can be inputs of the instances of the variant to preserve a relationship in terms of approximately equal number of parameters.

Additional Disclosure

The distillation loss does not have to be applied on the same head of the network as the loss of the true label. A separate head connected to the same network can be added instead for each teacher (or for a set of teachers), and each loss can be applied on a separate head or a group of losses can be applied to one head, where all heads are connected to the same network. A low strength of the loss for the weaker ensemble teacher limits the degradation in accuracy of the stronger student. Distillation loss does not have to be log-loss (cross-entropy) on the label. It can be, but distillation can also occur in logit space (e.g., using L2 loss between logits of the teacher and the student). Or any other loss can be used on the proper model units. Distillation does not have to be done at the top head, it is possible to do it on some unit in the student from a corresponding unit (or ensemble average) in the teacher. It typically should, however, capture the full prediction signal (otherwise, other paths in the network can compensate against it). Distillation can occur between any units, including distillation of a full teacher layer to the corresponding units of a student layer. If that is done, they should match in width.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system configured to improve the reproducibility of neural networks, the computing system comprising:
   one or more processors; and
   one or more non-transitory computer-readable media that collectively store:
      an ensemble that comprises a plurality of neural networks;
      a single neural network, wherein the single neural network exhibits a greater accuracy than the ensemble when trained on a shared training dataset for both the single neural network and the ensemble, wherein the single neural network comprises at least a first head and a second head that respectively generate a first head output and a second head output; and
      instructions that, when executed by the one or more processors, cause the computing system to perform operations, the operations comprising:
         accessing, by the computing system, one or more training examples;
         processing, by the computing system, each of the one or more training examples with the ensemble to obtain an ensemble output from the ensemble;

processing, by the computing system, each of the one or more training examples with the single neural network to obtain a network output from the single neural network; and training, by the computing system, the single neural network using a loss function that, at least in part, penalizes a difference between the network output and the ensemble output;

wherein the loss function used to train the single neural network comprises a distillation loss term and a supervised loss term, wherein the distillation loss term penalizes a difference between the first head output and the ensemble output, and wherein the supervised loss term penalizes a difference between the second head output and one or more ground truth labels associated with the one or more training examples.

2. The computing system of claim 1, wherein the operations further comprise, after training, by the computing system, the single neural network using the loss function:

deploying, by the computing system, the single neural network to generate inferences.

3. The computing system of claim 1, wherein a first number of parameters included in the single neural network is greater than or equal to a second number of parameters cumulatively included in the plurality of neural networks of the ensemble.

4. The computing system of claim 1, wherein a first number of multiply-add operations associated with operating the single neural network is greater than or equal to a second number of multiply-add operations associated with operating the plurality of neural networks of the ensemble.

5. The computing system of claim 1, wherein:

the plurality of neural networks included in the ensemble have identical architectures to each other;

each of the plurality of neural networks has an input layer, an output layer, and a number of hidden layers between the input layer and the output layer;

the single neural network has an input layer, an output layer, and a same number of hidden layers between the input layer and the output layer as each of the plurality of neural networks; and each of the hidden layers of the single neural network has a width that is equal to a width of a corresponding hidden layer of the plurality of neural networks multiplied by a square root of a number of neural networks included in the ensemble, wherein the number of neural networks included in the ensemble is a square number.

6. The computing system of claim 1, wherein:

at least some of the plurality of neural networks included in the ensemble have different architectures than each other; and at least some of the plurality of neural networks take different subsets of features from the one or more training examples as respective inputs.

7. The computing system of claim 1, wherein:

the plurality of neural networks of the ensemble have been decorrelated from each other during training of the ensemble using a decorrelation loss.

8. The computing system of claim 7, wherein the decorrelation loss is based on a correlation matrix computed over log-odds scores of all teacher component towers.

9. The computing system of claim 1, wherein:

the loss function comprises a temperature parameter that controls a tradeoff between the distillation loss term and the supervised loss term through, at least, multiplication of the distillation loss term with the temperature parameter; and the temperature parameter has a value less than or equal to 0.1.

10. The computing system of claim 1, wherein:

the loss function comprises a temperature parameter that controls a tradeoff between the distillation loss term and the supervised loss term; and training, by the computing system, the single neural network using the loss function comprises modifying, by the computing system, over time during said training to increase over time a relative influence of the distillation loss term relative to the supervised loss term.

11. The computing system of claim 1, wherein during said training, by the computing system, the single neural network using the loss function, the predictions of the ensemble are fixed to logged logit values previously generated by the ensemble.

12. The computing system of claim 1, wherein the one or more non-transitory computer-readable media further store:

an additional neural network that exhibits a greater accuracy than the single neural network when trained on a shared training dataset for both the single neural network and the additional neural network; and the operations further comprise:

processing, by the computing system, each of the one or more training examples with the additional neural network to obtain an additional network output from the additional neural network; and training, by the computing system, the single neural network using an additional loss function that, at least in part, penalizes a difference between the additional network output and the network output of the single neural network.

13. The computing system of claim 1, wherein the plurality of neural networks comprise a plurality of legacy networks for which historical predictions have been logged.

14. A computing system configured to improve the reproducibility of neural networks, the computing system comprising:

one or more processors; and one or more non-transitory computer-readable media that collectively store:

an ensemble that comprises a plurality of neural networks;

a first neural network, wherein the first neural network exhibits a greater accuracy than the ensemble when trained on a shared training dataset;

a second neural network, wherein the second neural network exhibits a lesser or equal accuracy to that of the first neural network when trained on the shared training dataset; and instructions that, when executed by the one or more processors, cause the computing system to perform operations, the operations comprising:

accessing, by the computing system, one or more training examples;

processing, by the computing system, each of the one or more training examples with the ensemble to obtain an ensemble output from the ensemble;

processing, by the computing system, each of the one or more training examples with the first neural network to obtain a first network output from the first neural network;

processing, by the computing system, each of the one or more training examples with the second neural network to obtain a second network output from the second neural network;

computing a first loss value based on a first difference between the second network output and the ensemble output;

computing a second loss value based on a second difference between the second network output and the first network output;

computing a combined loss value based on the first loss value and the second loss value; and training, by the computing system, the second neural network using the combined loss value.

15. The computing system of claim 14, wherein:
the loss function further penalizes a third difference between the second network output and a ground truth label; or
the loss function is applied at an output or on different units of the second neural network, wherein the different units comprise a full layer of the second neural network.

16. The computing system claim 14, wherein:
a first number of parameters included in the first neural network is greater than or equal to a second number of parameters cumulatively included in the plurality of neural networks of the ensemble; or
a first number of multiply-add operations associated with operating the first neural network is greater than or equal to a second number of multiply-add operations associated with operating the plurality of neural networks of the ensemble.

17. The computing system of claim 14, wherein:
the second neural network comprises at least a first head and a second head that respectively generate a first head output and a second head output;
the first head is trained based on the first difference; and
the second head is trained based on the second difference.

18. The computing system of claim 14, wherein training, by the computing system, the second neural network using the combined loss value comprises:
backpropagating the combined loss value through the second neural network.

19. The computing system of claim 14, wherein the operations comprise:
training the ensemble jointly with the second neural network.

20. The computing system of claim 19, wherein training the ensemble jointly with the second neural network comprises:
training the ensemble based on an ensemble loss that compares the ensemble output to a ground truth label.

21. The computing system of claim 14, wherein the combined loss value is computed using a temperature parameter that controls a tradeoff between the first loss value and the second loss value.

22. The computing system of claim 21, wherein the combined loss value comprises a weighted combination of the first loss value and the second loss value, the weighted combination defined using the temperature parameter.

23. The computing system of claim 21, wherein the operations comprise:
adjusting the temperature parameter over a plurality of training iterations.

24. The computing system of claim 14, wherein the combined loss value is based on a supervised loss that compares the second network output and a ground truth label.

25. A computer-implemented method, comprising:
obtaining, by a computing system comprising one or more computing devices, a neural network architecture, the neural network architecture having an input layer, an output layer, and one or more hidden layers between the input layer and the output layer;

replicating, by the computing system, the neural network architecture to generate an ensemble comprising a number of instances of the neural network architecture;

generating, by the computing system, a variant of the neural network architecture by increasing a width of each of the one or more hidden layers by a factor equal to a square root of the number of instances of the neural network architecture included in the ensemble, wherein the number of instances of the neural network architecture included in the ensemble is a square number; and training, by the computing system, an instance of the variant of the neural network architecture using a loss function that, at least in part, penalizes a difference between a first output generated by the instance of the variant of the neural network architecture for a common input and an ensemble output generated by the ensemble based on the common input.

26. The computer-implemented method of claim 25, wherein:
the instance comprises at least a first head and a second head that respectively generate a first head output and a second head output; and
the loss function used to train the instance comprises a distillation loss term and a supervised loss term, wherein:
the distillation loss term penalizes a difference between the first head output and the ensemble output, and
the supervised loss term penalizes a difference between the second head output and one or more ground truth labels associated with the one or more training examples.

27. The computer-implemented method of claim 26, wherein the training comprises:
training, by the computing system, the first head based on the distillation loss term; and
training, by the computing system, the second head based on the supervised loss term.

* * * * *